United States Patent
Brower et al.

(10) Patent No.: US 11,609,587 B2
(45) Date of Patent: Mar. 21, 2023

(54) PROCESS MONITORING AND CONTROL USING BATTERY-FREE MULTIPOINT WIRELESS PRODUCT CONDITION SENSING

(71) Applicant: IMA LIFE NORTH AMERICA INC., Tonawanda, NY (US)

(72) Inventors: Joseph Brower, Raleigh, NC (US); Arnab Ganguly, Williamsville, NY (US); Ernesto Renzi, Youngstown, NY (US); Francis W. Demarco, Niagara Falls, NY (US); Michele Arduini, Ozzano dell'Emilia (IT)

(73) Assignee: IMA LIFE NORTH AMERICA INC., Tonawanda, NY (US)

(*) Notice: Subject to any disclaimer, the term of this patent is extended or adjusted under 35 U.S.C. 154(b) by 524 days.

(21) Appl. No.: 16/805,785

(22) Filed: Mar. 1, 2020

(65) Prior Publication Data
US 2020/0201369 A1    Jun. 25, 2020

Related U.S. Application Data

(62) Division of application No. 15/546,023, filed as application No. PCT/US2016/014849 on Jan. 26, 2016, now abandoned.
(Continued)

(51) Int. Cl.
*G05D 23/19* (2006.01)
*F26B 5/06* (2006.01)
(Continued)

(52) U.S. Cl.
CPC .......... *G05D 23/1917* (2013.01); *F26B 5/06* (2013.01); *G01K 1/024* (2013.01); *G01K 1/14* (2013.01);
(Continued)

(58) Field of Classification Search
None
See application file for complete search history.

(56) References Cited

U.S. PATENT DOCUMENTS 3,281,949 A * 11/1966 Tyson ................ F26B 5/06
                                                    62/282
4,716,492 A   12/1987 Charboneau
(Continued)

FOREIGN PATENT DOCUMENTS

CN    201828949 U   5/2011
EP    2034263 A1    3/2009
(Continued)

OTHER PUBLICATIONS

Sam Duby et al., Printed Thermocouple Devices, Brunel University, Surry, UK, available on line at http://citeseerx.ist.psu.edu/viewdoc/download?doi=10.1.1.426.5220&rep=rep1&type=pdf (IEEE 2012).
(Continued)

*Primary Examiner* — David J Laux
(74) *Attorney, Agent, or Firm* — Luccarelli & Musacchio LLP; Pasquale Musacchio (57) ABSTRACT

An arrangement for monitoring an aseptic manufacturing process includes product condition sensors capable of making closely spaced measurements of a product condition such as temperature or humidity. The measurements are made using closely spaced sensors arranged in a linear array on a single probe, which may be used to take measurements at multiple levels within the product. Data from the sensors is transmitted to a data collection point via short range wireless digital communications. The sensors may be used to measure temperature and humidity at a single point. For example, when the sensors are used in pharmaceutical freeze
(Continued)

drying, the location of a sublimation front may be calculated for each vial, and the freeze drying process may be controlled using the data.

20 Claims, 6 Drawing Sheets

Related U.S. Application Data (60) Provisional application No. 62/172,829, filed on Jun. 9, 2015, provisional application No. 62/108,589, filed on Jan. 28, 2015.

(51) Int. Cl.
  G01K 1/14      (2021.01)
  G01K 1/024     (2021.01)
  G01K 7/34      (2006.01)
  H04W 4/70      (2018.01)
  G05D 22/02     (2006.01)
  G05D 27/02     (2006.01)
  G06Q 10/06     (2012.01)
  G06Q 10/0639   (2023.01)

(52) U.S. Cl.
  CPC .............. *G01K 7/34* (2013.01); *G05D 22/02* (2013.01); *G05D 23/1904* (2013.01); *G05D 23/1919* (2013.01); *G05D 23/1932* (2013.01); *G05D 27/02* (2013.01); *G06Q 10/06395* (2013.01); *H04W 4/70* (2018.02); *G01K 2215/00* (2013.01)

(56) References Cited

U.S. PATENT DOCUMENTS

| | | | |
|---|---|---|---|
| 4,969,956 A | | 11/1990 | Kreider |
| 5,447,374 A | | 9/1995 | Fraser |
| 5,792,938 A | | 8/1998 | Gokhfeld |
| 5,929,337 A | * | 7/1999 | Collins .............. G01N 29/2412 73/628 |
| 5,964,043 A | * | 10/1999 | Oughton ................... F26B 5/06 34/92 |
| 7,347,004 B1 | * | 3/2008 | Halvorsen ................. F26B 5/06 34/76 |
| 8,534,556 B2 | * | 9/2013 | Drzymala ........... G06K 7/10831 235/454 |
| 2002/0147394 A1 | | 10/2002 | Ellingsen |
| 2005/0008061 A1 | | 1/2005 | Kaneko |
| 2005/0015175 A1 | | 1/2005 | Huang |
| 2006/0239331 A1 | | 10/2006 | Schwegman |
| 2008/0041152 A1 | * | 2/2008 | Schoenberg .......... G01F 23/246 73/295 |
| 2008/0239478 A1 | * | 10/2008 | Tafas ............... G01N 35/00732 359/396 |
| 2009/0001042 A1 | | 1/2009 | Sever |
| 2009/0175315 A1 | * | 7/2009 | Schwegman ............. F26B 5/06 374/E1.001 |
| 2009/0276179 A1 | * | 11/2009 | Barresi .................. G01K 1/024 702/182 |
| 2011/0044427 A1 | * | 2/2011 | Featonby .............. G01F 23/288 250/361 R |
| 2011/0247234 A1 | * | 10/2011 | Friess ....................... F26B 5/06 356/73.1 |
| 2011/0277803 A1 | | 11/2011 | Grande |
| 2012/0097744 A1 | | 4/2012 | Drzymala |
| 2012/0192447 A1 | * | 8/2012 | Thompson, Jr. .......... F26B 5/06 34/287 |
| 2012/0294328 A1 | | 11/2012 | Mujat |
| 2013/0293624 A1 | * | 11/2013 | Lester .................. B41J 2/17566 347/19 |
| 2014/0230472 A1 | * | 8/2014 | Coradetti ............. A01N 1/0242 62/125 |
| 2014/0259724 A1 | * | 9/2014 | McCarthy ................. F26B 5/06 34/92 |
| 2014/0352329 A1 | | 12/2014 | Bloedow |
| 2014/0373382 A1 | | 12/2014 | Ling |
| 2018/0274986 A1 | * | 9/2018 | Ganguly .................. B65D 1/09 |

FOREIGN PATENT DOCUMENTS

| | | |
|---|---|---|
| WO | 2006/092885 A1 | 9/2006 |
| WO | 2009/030760 A1 | 3/2009 |
| WO | 2013/147759 A1 | 10/2013 |

OTHER PUBLICATIONS

Marco Parvis et al., Sputtered Thermocouple for Lyophilization Monitoring, IEEE 978-1-4577-1772-7/12 (2012).
Sigma-Aldrich Specification Sheet, "Silver nanoparticle Ink" (printed from Web Sep. 2, 2015).
MatWeb Material Property Data Sheet for "Gwent Electronic Materials C2031105D2 Palladium Ink" (printed from Web Sep. 2, 2015).
Yasui Seiki flyer "Non-Silicone Release Film—Laminated Polypropylene Film-" (printed from Web Sep. 2, 2015).

\* cited by examiner

PROCESS MONITORING AND CONTROL USING BATTERY-FREE MULTIPOINT WIRELESS PRODUCT CONDITION SENSING

PRIORITY CLAIM

This application is a divisional application of copending U.S. patent application Ser. No. 15/546,023, filed Jul. 25, 2017, entitled "PROCESS MONITORING AND CONTROL USING BATTERY-FREE MULTIPOINT WIRELESS TEMPERATURE SENSING," which is a national phase application under section 371 of international application no. PCT/US2016/14849, filed Jan. 26, 2016, which claims the benefit of U.S. Provisional Application No. 62/108,589, filed Jan. 28, 2015, and U.S. Provisional Application No. 62/172,829, filed Jun. 9, 2015, all of which are hereby incorporated by reference herein.

FIELD OF THE INVENTION

The present invention relates to processing and equipment for handling an aseptic product under tightly controlled temperature and humidity conditions. More specifically, the invention relates to the measurement and monitoring of an aseptic process such as a freeze drying process, especially for products such as pharmaceutical products.

BACKGROUND

Pharmaceutical manufacturing processes are typically carried out in carefully controlled environments. Conditions within those environments must be closely monitored. Those conditions include temperature and humidity, measured both within the product being processed and at selected locations within the controlled environment. As used herein, the term "humidity" refers to absolute humidity, which is the water content of air. Absolute humidity may, for example, be measured as grams of water per cubic meter of air.

Environmental isolators may be used to maintain carefully controlled aseptic conditions for pharmaceutical processing systems such as container filling systems and packaging systems. The isolators are typically capable of maintaining a "class A" aseptic environment in a surrounding "class C" production room. Such isolators include a dedicated air circuit. Measurements of temperature and humidity at important points within the isolator are necessary to control the air circuit and to monitor for leaks, faults, etc. Temperature and humidity measurements together influence the outcomes of processes taking place in the isolator. Those measurements are made in such isolators using separate sensors.

Freeze drying is a process that removes a solvent or suspension medium, typically water, from a product. Other solvents, such as alcohol, may also be removed in freeze drying processes.

In a freeze drying process for removing water, the water in the product is frozen to form ice and, under vacuum, the ice is sublimed and the vapor flows towards a condenser. The water vapor is condensed on the condenser as ice and is later removed from the condenser. Freeze drying is particularly useful in the pharmaceutical and bio-pharmaceutical industries, as the integrity of the product is preserved during the freeze drying process and product stability can be guaranteed over relatively long periods of time. The present disclosure is also applicable to the food industry and other industries with similar requirements. The freeze dried product is ordinarily, but not necessarily, a biological substance.

Pharmaceutical freeze drying is often an aseptic process that requires sterile and carefully controlled conditions within the freeze drying chamber. It is critical to assure that all components of the freeze drying system coming into contact with the product are sterile.

Most freeze drying under aseptic conditions is done in a freeze dryer designed for vials, wherein product is contained in vials placed on trays or shelves. In one example of a prior art freeze drying system 100 shown in FIG. 1, a batch of product is placed in vials 112 arranged on freeze dryer trays 121 within a freeze drying chamber 110. Freeze dryer shelves 123 are used to support the trays 121 and to transfer heat to and from the trays and the product as required by the process. A heat transfer fluid flowing through conduits within the shelves 123 is used to remove or add heat.

Figure 1:
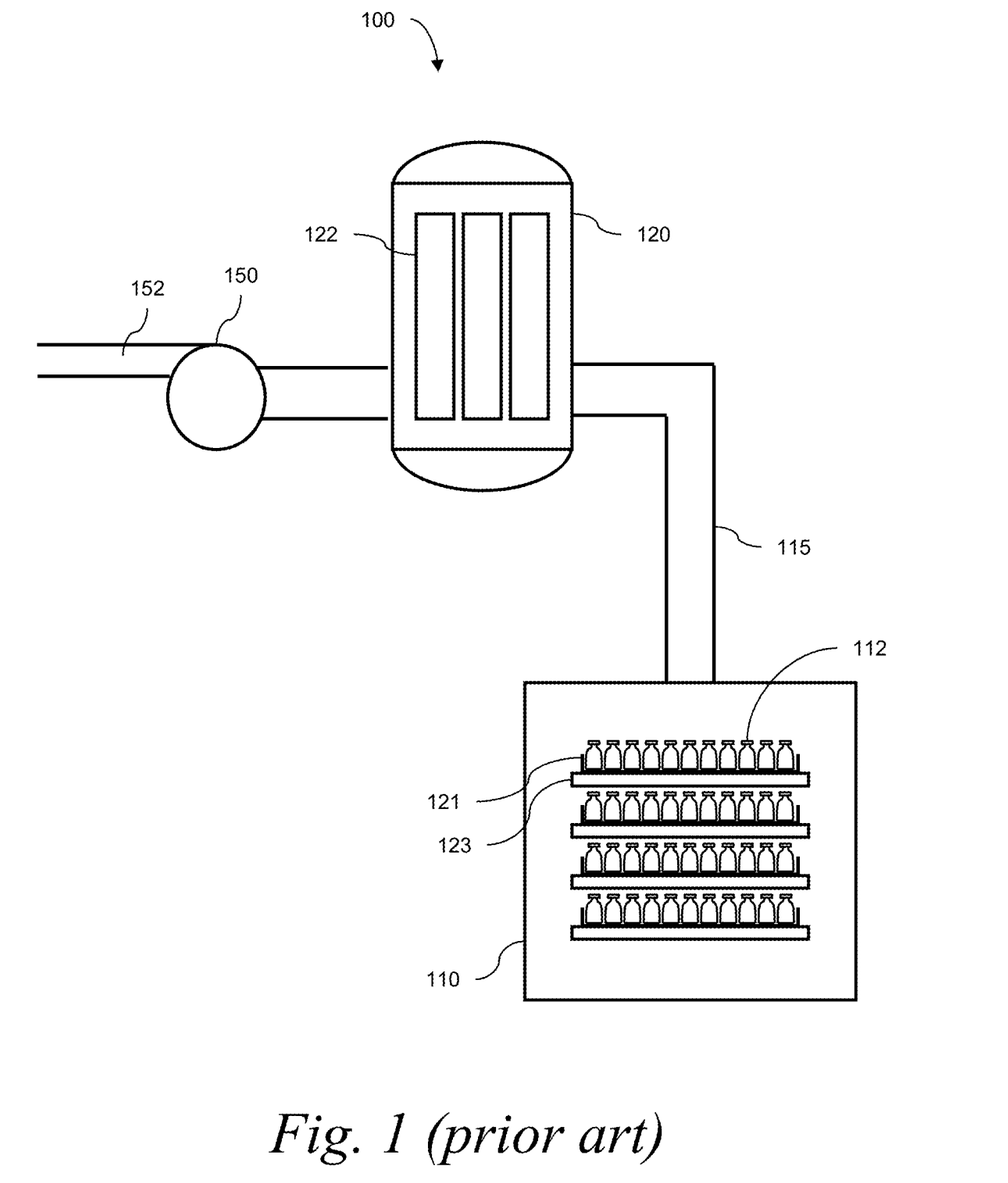
FIG. 1 is a schematic drawing of a current freeze drying system.

The product drying chamber is then evacuated using a vacuum pump 150. Under vacuum, the frozen product in the vials 112 is heated slightly to cause sublimation of the ice within the product. Water vapor resulting from the sublimation of the ice flows through a passageway 115 into a condensing chamber 120 containing condensing coils or other surfaces 122 maintained below the condensation temperature of the water vapor. A coolant is passed through the coils 122 to remove heat, causing the water vapor to condense as ice on the coils.

Both the freeze drying chamber 110 and the condensing chamber 120 are maintained under vacuum during the process by a vacuum pump 150 connected to the exhaust of the condensing chamber 120. Non-condensable gases contained in the chambers 110, 120 are removed by the vacuum pump 150 and exhausted at a higher pressure outlet 152.

As the freeze drying process progresses, a sublimation front forms in each vial and moves from the exposed top surface of the product to the bottom of the vial. The sublimation front defines a boundary between freeze dried product above the front, and frozen product containing frozen solvent below the front. In an individual vial, the freeze drying process is complete when the sublimation front reaches the bottom of the vial.

Accurately monitoring product attributes such as temperature and residual moisture during and after the process is critical to process development and work related to process scale-up, especially in the pharma/bio-pharmaceutical industry. Furthermore, the ability to control product conditions according to critical ranges during production is essential for successfully processing a batch of freeze-dried product. In existing systems, the product temperature is typically monitored by using wired thermocouples that are connected to electrical ports provided in the freeze dryer chamber for that purpose. Product residual moisture is typically measured after the manufacturing process as a destructive test using analytical techniques such as loss on drying or Karl Fischer titration methods.

Because of the variation in heat transfer among the multiple shelves on which the product vials are placed, the product attributes, including temperature and residual moisture, are position-dependent within the freeze drying chamber. To monitor temperature in an existing system, multiple (typically 8-16) thermocouples may be used in multiple separate vials in a development cycle to understand that positional variation. Such a setup, with multiple thermocouple wires across the vials placed in the product chamber, can be cumbersome to handle and can sometimes lead to product loss and/or errors in data collection. To monitor residual moisture, multiple samples are taken at locations throughout the chamber. The testing is time-consuming, and the product in each tested vial is destroyed.

There is a need for an improved technique for monitoring product conditions both during the development and during production of aseptic, environment-controlled processes such as freeze drying. The technique should eliminate the potential errors and process disruption caused by wired probes, and should be expeditious and non-destructive. The technique should maximize measurement resolution within the volume of the chamber and within the vial. The technique should provide real time data that may be used in controlling a freeze drying process or another process requiring accurate control of conditions.

SUMMARY

The present disclosure addresses the needs described above by providing an arrangement for monitoring a freeze drying process or another aseptic process, using product condition sensors capable of making closely spaced measurements of a product condition such as temperature or humidity. The measurements are made using closely spaced sensors arranged in a linear array on a single probe, which may be used to take measurements at multiple levels within the product. Data from the sensors is transmitted to a data collection point via short range wireless digital communications. The sensors may be used to measure temperature and humidity at a single point. The location of a sublimation front may be calculated from the measurements.

Exemplary embodiments of the disclosure feature a product condition measurement unit for measuring a condition profile of a product contained in a product vial being processed in an aseptic pharmaceutical processing chamber. The product condition measurement unit includes a support structure for positioning in an opening of the product vial, and a single elongate probe supported by the support structure and having a plurality of sensors spaced longitudinally along the single elongate probe at incremental distances from the support structure. The product condition measurement unit additionally comprises a processor supported by the support structure and connected for receiving measurements from the plurality of sensors.

Other embodiments of the present disclosure include a method for freeze drying a product containing a frozen solvent, the product being in a plurality of vials having vial openings and arranged in a freeze drying chamber. The product is subjected to process conditions causing sublimation of the frozen solvent. In a vial of the plurality of vials, while the product is subjected to the process conditions, a location of a sublimation front is measured using a linear array of product condition sensors arranged along a single elongate measurement probe extending into the product, the array having a pitch of less than 2 mm. The process conditions are controlled based on the measured location of sublimation front.

Additional embodiments of the disclosure include an aseptic pharmaceutical processing system. The system comprises an aseptic enclosure for aseptically isolating an interior of the enclosure from ambient atmosphere, and an environmental control apparatus connected for controlling conditions in the interior of the aseptic enclosure. At least one measurement unit is positioned to measure temperature and humidity in the interior of the aseptic enclosure. The measurement unit is connected for providing measurements to the environmental control apparatus. The measurement unit comprises a sensor and processor for measuring both temperature and humidity at a single location in space.

The respective features of the exemplary embodiments of the disclosure may be applied jointly or severally in any combination or sub-combination.

BRIEF DESCRIPTION OF THE DRAWINGS

The exemplary embodiments disclosed herein can be understood by considering the following detailed description in conjunction with the accompanying drawings, in which.

DESCRIPTION

Wireless sensors such as temperature sensors are employed in some current systems as single point monitoring probes in product containment vials. Those sensors may be induction-based sensing systems that are wirelessly excited to determine a resonant frequency that varies with temperature. Other arrangements use thermocouples that communicate with a data acquisition module. Because of the sensing technique and the physical size of those sensors, it is generally feasible to use only a single sensor per sensing probe. Additionally, induction-based sensors operate based on the excitation of a crystal in an electromagnetic field, and induction-based sensors that are placed in proximity tend to interfere with each other, discouraging the use of multiple sensors per vial.

Wireless capacitive humidity sensors are currently employed as single point monitoring devices typically applied to at- or near-room-temperature applications such as museums, printers and greenhouses.

Figure 2:
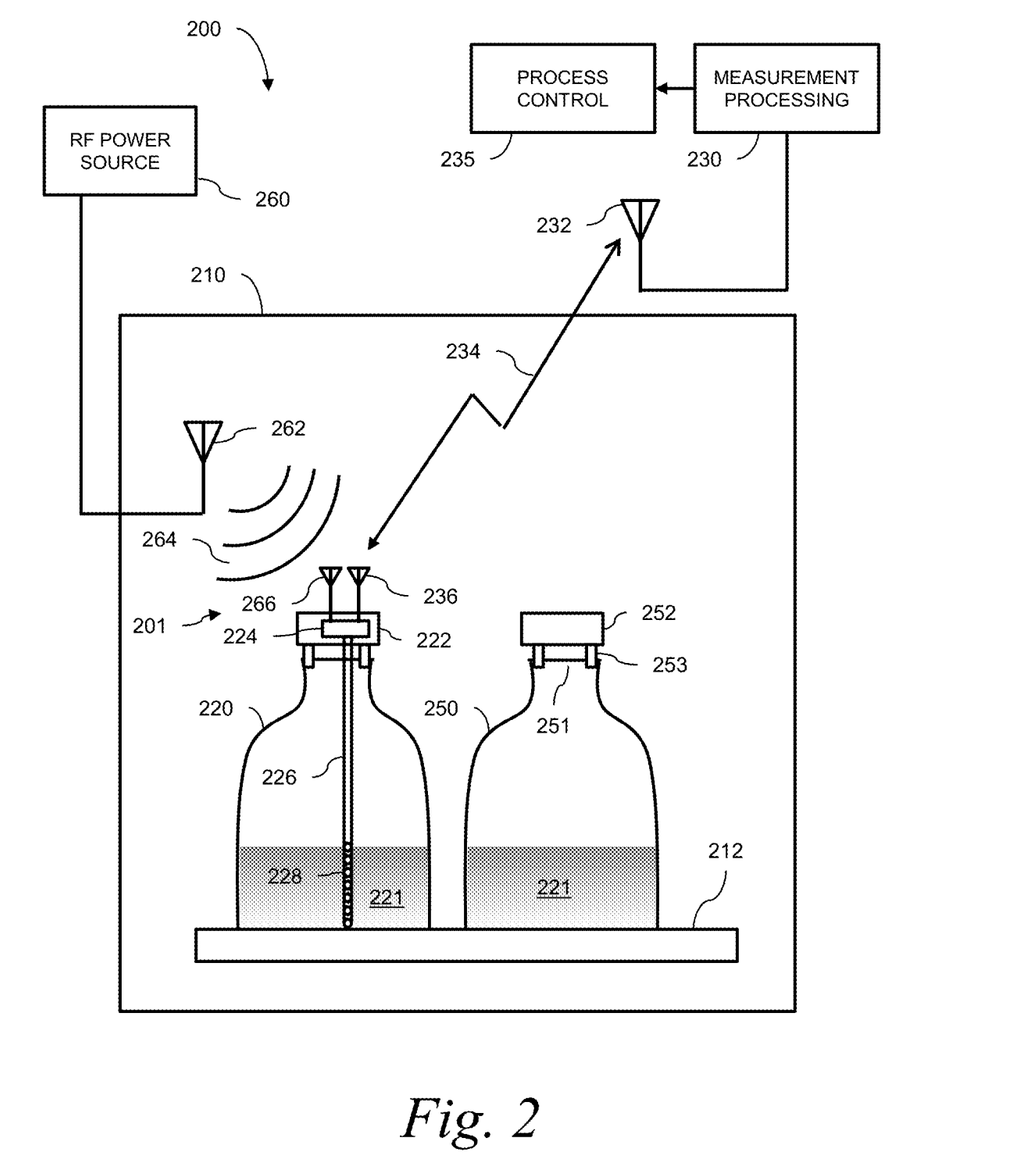
FIG. 2 is a schematic drawing of a freeze drying process monitoring system according to one aspect of the disclosure.

A freeze drying system 200 in accordance with embodiments of the present disclosure is shown schematically in FIG. 2. A product condition measurement unit 201 in accordance with embodiments of the present disclosure is shown schematically in FIG. 3. Systems in accordance with the disclosure will be described with reference to those figures.

A freeze drying chamber 210 is connected with equipment (not shown) for evacuating the interior of the chamber 210 and for controlling the temperature of product contained in the chamber, such as by heating a shelf 212. Product vials 220, 250 are supported by the shelf 212 and contain product 221 to be freeze dried. The vial 250 is fitted with a closure 252. The closure 252 may be in a raised position, as shown, wherein closure legs 253 or other means support the closure in an open condition in the vial opening 251, allowing solvent vapor to escape during the freeze drying process. After the freeze drying process is completed, the closure is pressed downward to a fully seated position, closing the opening 251. Standard closures 252 are available in several designs, each with its own geometry and vapor flow characteristics.

The vial 220 is equipped with a product condition measurement unit 201 (FIGS. 2 and 3) comprising a support structure 222, a single elongate probe 226, a printed circuit board 224 with circuitry as described below, and signal receivers 266, 236. A freeze drying system in accordance with embodiments of the disclosure may contain tens of thousands of vials. A selected subset of those vials is fit with product condition measurement units 201; the remaining vials are closed using standard closures 252. The subset of vials fit with product condition measurement units 201 is chosen to provide an optimum map of product conditions in the chamber 210.

Figure 3:
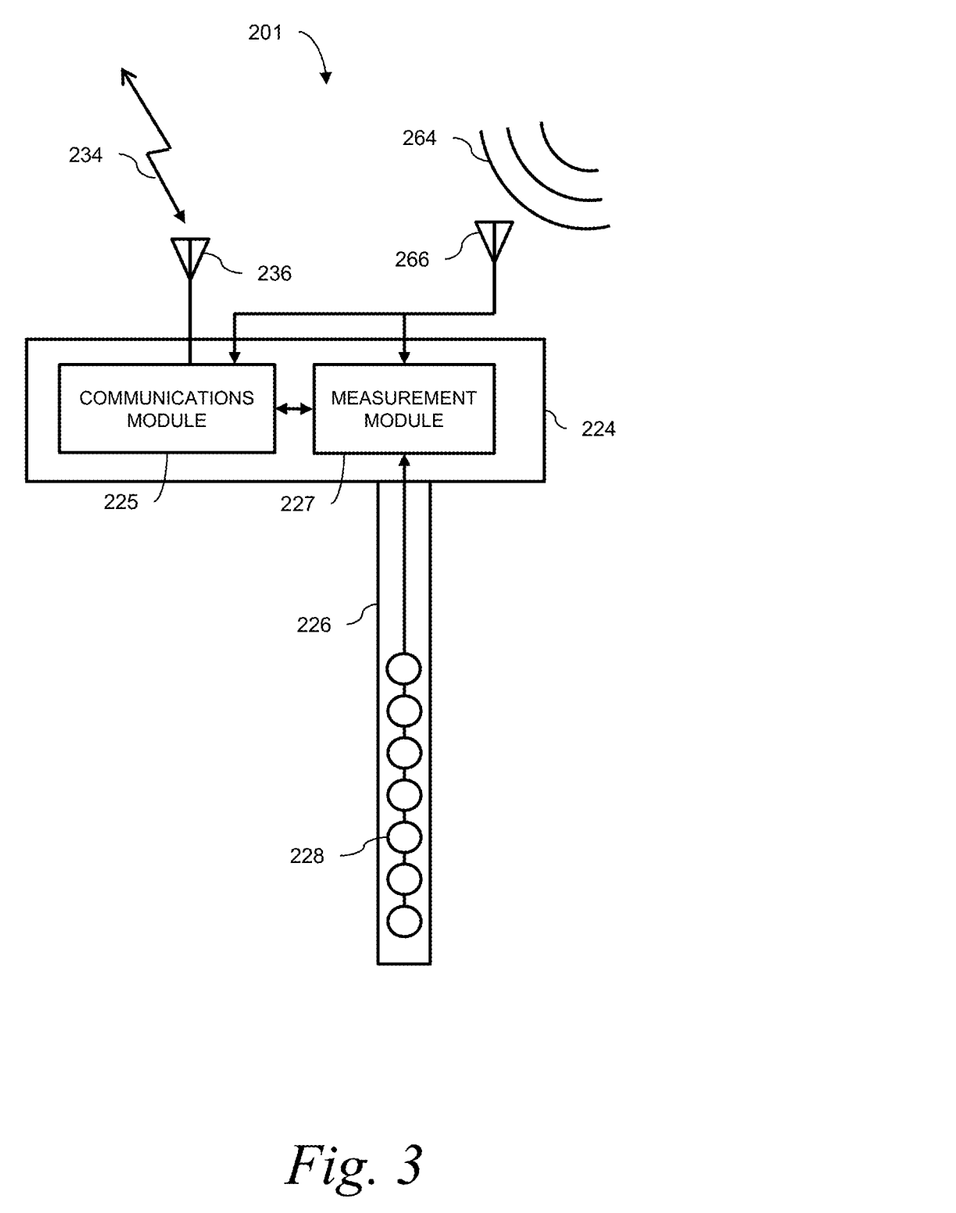
FIG. 3 is a schematic view of a product condition measurement unit according to one aspect of the disclosure.

The support structure 222 is designed to match the geometry and vapor flow characteristics of the other closures 252 used in the freeze drying system. In that way, product condition profiles of neighboring vials may be estimated using information from a single instrumented vial.

A "probe," as that term is used herein, is a single member that is inserted into a product to test conditions at or near the probe. The presently disclosed arrangement utilizes a single elongate probe 226 that supports a plurality of sensors 228 at locations in or near the product 221. That arrangement provides several advantages. Because the arrangement attempts to estimate conditions in nearby product vials 250 by measuring conditions in the vial 220, it is critical that the probe itself create a minimum disturbance of characteristics in the vial such as temperature and sublimation rate. By using a single elongate probe 226 to support multiple sensors 228, disruption of the measured conditions is minimized as compared with the use of multiple probes supporting multiple sensors. Further, because the sensors 228 are supported by the same probe 226, spacing between the sensors is fixed, thereby increasing the accuracy of a measured profile.

In one exemplary embodiment of the present disclosure, more than six evenly spaced capacitive sensors monitor product conditions such as temperature and humidity and monitor gradients of those conditions along the product fill in the containment vial 220. In embodiments, seven sensors may be used. In other embodiments, more than three sensors are used. More or fewer sensors may be used depending on the desired resolution of the measured profile, and on the physical size of the sensors. In embodiments, the sensors 228 may comprise capacitors based on ceramic surface-mount devices. The sensors may require less than 2 mm of space as mounted on a circuit board. Six or more such sensors may therefore be placed in a 12 mm measurement line, permitting the measurement of a profile with relatively high resolution. The sensors may alternatively be integral components of the printed circuit.

The capacitive sensors 228 may be arranged to make multiple measurements in a linear array having a high spatial resolution. That multi-point sensing capability permits the measurement of a gradient in a small space, such as a small product fill in a vial. The sensors 228, together with circuitry and signal receivers 266, 236, may be mounted on the single printed circuit board 224 that also forms the structural and electrical connection components of the elongate probe 226.

A measurement module 227 (FIG. 3) is included on the printed circuit board 224 and receives measurements from the sensors 228 and converts the measurements to data useable by other components of the freeze drying system. The measurement module 227 may include specialized circuitry for measuring capacitance or another characteristic from the sensors 228. The measurement module 227 may include a software module of a processor mounted on the printed circuit board for storing values such as calibration values and for converting capacitance measurements into product condition measurements such as temperature measurements and humidity measurements.

Such temperature measurements may be used in monitoring and controlling a freeze drying process as described below. Additionally, such local humidity measurements of air between particles of the product are reliable indicators of residual moisture in the product, and may therefore be used to measure the efficacy of the freeze drying process.

A communications module 225 is also included on the printed circuit board 224 and manages the transmission of data from the measurement unit 201 to a measurement processing module 230 located outside the chamber 210. The communications module 225 performs communications tasks using a sensor sampling protocol such as the ANT™ open access multicast wireless sensor network protocol. Measurements received from the measurement module 227 are wirelessly transmitted by the communications module 225 using a data transmission antenna 266 via a signal 234 utilizing the industrial, scientific and medical (ISM) band (2.4 GHz) of the radio spectrum, and received outside the freeze drying chamber 210 by the measurement processing module 230 via a communications antenna 232.

The sensors 228 may be calibrated individually at known product condition calibration points. The resulting calibration coefficients and offsets may be stored on board the measurement unit 201 in the measurement module 227. Alternatively, calibration information for individual measurement units 201 in the sensor system may be stored with corresponding unit ID codes in a database accessible to the measurement processing module 230 located outside the freeze drying chamber.

Common temperature/humidity sensing from the same sensing device is possible through simple capacitance-temperature/humidity calibration curves. Thus, by measuring the capacitance, corresponding temperature during a freeze drying process and humidity at the end of the process can be measured using the wireless RF powered devices communicating with data acquisition.

In accordance with embodiments of the present disclosure, temperature and humidity may be computed from a single capacitance measurement made at a single point in space where a sensor 228 is positioned. The sensors 228 are calibrated to temperature values, and a temperature versus capacitance curve is stored. The sensors 228 are separately calibrated to humidity values at one or more constant temperatures, and those values are stored as humidity versus capacitance curves.

A capacitance measurement by the sensor 228 is then converted directly into a temperature measurement using the temperature versus capacitance curve. The same capacitance measurement is converted to a humidity reading using the humidity versus capacitance curves.

The product condition measurement unit 201 utilizes a unique ID code to identify itself to the measurement processing module 230. Initial loading of the vials 220, 250 onto the shelves 212 of the freeze drying chamber 210 is done in such a way that the locations of the individual product condition measurement modules 227 are known and tabulated. In an auto loading system using a loading track, positions along the track can be traced to locations on the shelves within the freeze drying chamber 210. Upon the receipt of a measurement by the measurement processing module 230, the unique code is then correlated to the location of the identified product condition measurement unit 201 within the chamber 210, allowing the received product condition measurements to be mapped to that location for analysis and process control.

Processed measurement data from the measurement processing module 230 is transmitted to other modules for use. For example, the data may be transmitted to a process control module 235 for real-time control of the freeze drying process based on temperature data. Data measured by the same sensors 228 once the process is complete and the chamber is brought back to atmospheric pressure may be used to map humidity as an indicator of residual moisture in the product without the use of destructive testing. The temperature and humidity data may alternatively be transferred to a data analysis module for process development, scaling up and quality analysis.

The techniques described herein may be performed in part by a discrete processor, an industrial controller or a computer used in conjunction with the described processing equipment. For example, the process control module 235 may reside in a programmable logic controller (PLC) that has operating logic for valves, motors, etc. The measurement processing module 230 may reside in a personal computer (PC) or a PLC or both. Communications with the product condition measurement units 201 may be handled by a USB ANT™ plug-in module that includes an integral communications antenna and firmware for sampling the measurement processing modules and forwarding the received information to the host PC. Such modules may utilize single-chip ANT™connectivity ICs such as are available from Nordic Semiconductor® of Oslo, Norway. Data acquisition may alternatively be performed by other specialized devices or by using short range communication capabilities of standard devices such as a tablet or a smart phone.

The measurement units 201, as well as the PLC and the PC, include central processing units (CPU) and memory. The PLC and the PC also comprise input/output interfaces connected to the CPU via a bus. A PLC is typically connected to the processing equipment via the input/output interfaces to receive data from sensors monitoring various conditions of the equipment such as temperature, position, speed, flow, etc. The PLC is also connected to operate devices that are part of the equipment, such as the vacuum pump 150 (FIG. 1) and thermal fluid circulation in the shelves 212.

The memory may include random access memory (RAM) and read-only memory (ROM). The memory may also include removable media such as a disk drive, tape drive, thumb drive, etc., or a combination thereof. The RAM may function as a data memory that stores data used during execution of programs in the CPU, and is used as a work area. The ROM may function as a program memory for storing a program including the steps executed in the CPU. The program may reside on the ROM, and may be stored on the removable media or on any other tangible, non-transitory computer-readable medium in the PLC or the PC, as computer readable instructions stored thereon for execution by the CPU or other processor to perform the methods disclosed herein.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude propagated signals, which are not tangible and are not non-transitory. Cached information is considered to be stored on a computer-readable medium. Common expedients of computer-readable media are well-known in the art and need not be described in more detail here.

The product condition measurement unit 201 is wirelessly powered via a radio frequency energy harvesting board 266. A radio frequency powering signal 264 is generated by a radio frequency power signal source 260 and transmitted within the chamber 210 using a powering antenna 262 in the chamber. Multiple powering antennae 262 may be used within the chamber to power a large number of measurement units and to establish line-of-sight communication with all measurement units 201. The use of wireless radio frequency powering of the measurement units 201 eliminates the need for power wires and batteries, both of which are problematic in a freeze drying process. Because both the communications and the power supplies of the measurement units 201 are wireless, the measurement units may be used in an automatically loaded system wherein locations of the measured vials in the freeze dying chamber are tracked and associated with unique ID codes of the measurement units.

Figure 4:
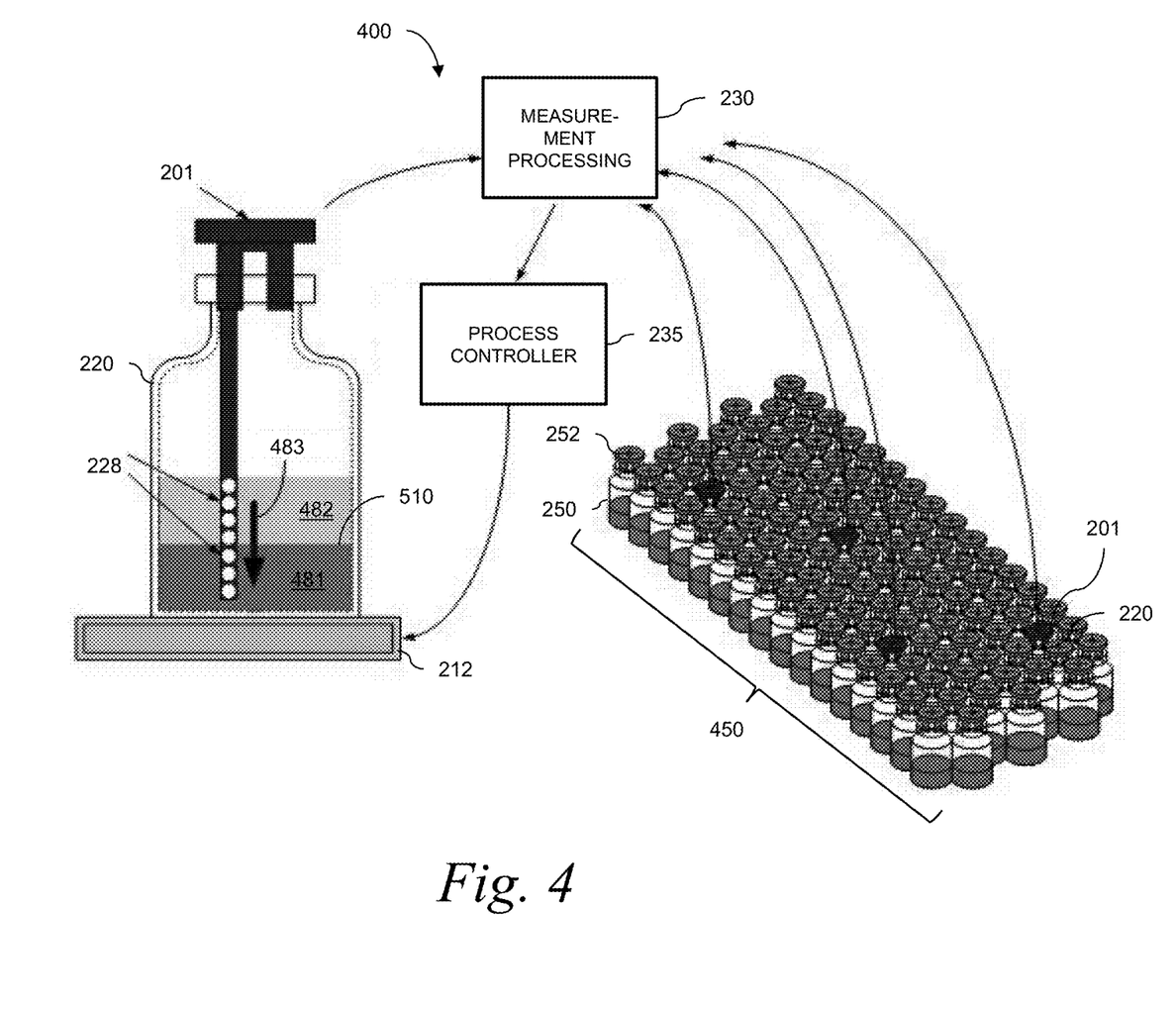
FIG. 4 is a schematic drawing of a freeze drying process monitoring system according to one aspect of the disclosure.

A process control arrangement 400, shown in FIG. 4, demonstrates the use of the product condition measurement units to measure product conditions such as temperatures in a subset of vials and to control the freeze drying process. Of the batch of vials 450 shown in FIG. 4, only four vials 220 are fitted with product condition measurement units 201. The remaining vials 250 of the batch 450 are fitted with standard closures 252 such as commercially available stoppers made for that purpose.

Choosing the locations of the measurement units 201 within the freeze drying chamber may be based on historical measurement data or on qualitative characteristics of the chamber. For example, it may be known that certain locations in the chamber are expected to contain the warmest or coldest vials during a freeze drying cycle, or the most representative vials of the batch 450, based on data gathered during process development or based on past production data. Vials at those locations are fitted with the measurement units 201. Measurements taken in the vials 220 fitted with the measurement units 201 are used to control processing conditions for the entire batch 450 of vials.

Measurement data from the sensors 228 is wirelessly transmitted from the measurement units 201 to the measurement processing module 230. For each measurement unit 201, the transmitted data includes a unique ID code that is used by the measurement processing unit 230 to look up a location in the chamber (row, column and shelf) where the measurement was taken.

The processed data is then transmitted to the process controller 235. Using the received measurement data from the vials 220, the process controller 235 can control the freeze drying process in real time to optimize product condition profiles in all the vials in the batch 450. In the arrangement 400, the process controller 235 controls the flow of heat transfer fluid to the shelves 212 in the freeze drying chamber, thereby controlling the transfer of heat to the supported vials. For example, the overall flow of heat transfer fluid to the shelves may be controlled based on the temperature within one or more vials 220 in the chamber. Overall shelf temperature in the chamber may be reduced based on the warmest vial in the chamber.

In another example, the flow of heat transfer fluid to individual shelves or individual regions of shelves is individually controlled. If it is found that sublimation is taking place in vials on a particular shelf at a rate that is behind that of the overall process, the flow rate or temperature of the heat transfer fluid to that particular shelf or region may be adjusted to increase the heat transfer rate from that shelf to the supported vials, and to bring the sublimation rate in those vials back in line with the overall process.

The tightly arranged capacitive sensors 228 are distributed along the probe 226 (FIG. 3) to enable the precise measurement of gradients along the product fill in the vials 220. Each probe contains up to seven or more capacitive sensors, and a large number of measurement units 201 may be deployed (maximum theoretical limit $2^{32}$) throughout the load matrix of tens of thousands of vials in the freeze drying chamber.

As the product dries, a sublimation front 510 propagates through the vial along a drying vector 483 (FIG. 4). In each vial, the sublimation front 510 separates frozen product 481, containing frozen water, from dry product 482 wherein the freeze drying process has been completed. As the freeze drying process progresses, the temperature of the front increases due to increasing resistance offered by it to mass transfer of the solvent vapor. Tracking the sublimation front can be a useful process analytical technique to quantify end of drying, or product uniformity characterization, which are critical to process characterization. While the locations of the sublimation fronts are measured only within the vials 220 fitted with measurement units 201, processing conditions for the entire batch 450 may be controlled based on those measurements.

Current technology allows measurement of only a single temperature point on a probe, which, in turn, leads to conservative process control because the measurement is not at the ice interface until near the end of the process. In contrast, the presently described technique is capable of providing a high spatial resolution temperature profile along the product fill. That characteristic may be used to advantage in precisely locating the sublimation front during processing.

Figure 5:
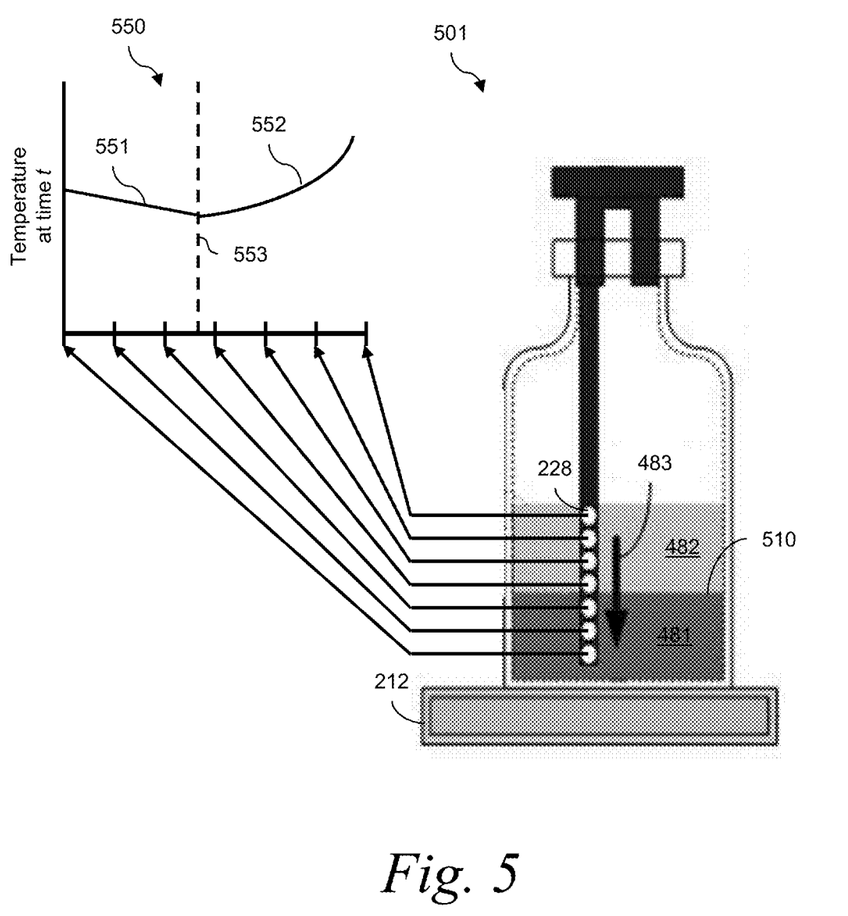
FIG. 5 is a schematic graph showing a temperature profile within a product vial according to one aspect of the disclosure.

In the example process 501 shown in FIG. 5, a sublimation front 510 is propagating along a drying vector 483. The sublimation front 510 separates frozen product 481 from dry product 482 during a freeze drying process. A theoretical single scan of product condition measurements, at a given time t, from the sensors 228 is shown in a graph 550. In the example shown, a temperature profile 551 in the frozen product 481 shows a higher temperature measured by the sensors closer to the shelf 212 and decreasing temperatures toward the line 553 representing the sublimation front 510. The temperature profile 552 of the dry product 482, on the other hand, increases with distance from the frozen product below. The temperature profile shown in the graph 550 is merely exemplary, and the exact profile for a given process will vary for different process rates, different product types and different vial geometries.

It can be seen that an analysis of the temperature profile along the drying vector within a vial will yield a location of the sublimation front. The analysis may comprise, for example, the determination of a maximum, a minimum, a point of inflection, a discontinuity, or another parameter.

Using current communications technology, the sensors may be sampled at rates up to one sample per microsecond. Multiple samples of a given probe over time may be employed to determine a maximum or a minimum rate of temperature change along the profile, or another time-domain parameter that may be used to locate the sublimation front. The sublimation front in a particular process may therefore be located using a profile-based parameter, a rate-based parameter, or another derived from the temperature measurements. The best parameter to use in a particular process may be determined experimentally.

A propagation rate of the sublimation front along the drying vector may also be determined and used to control the process.

Moreover, the same sensing device is capable of measuring humidity as an end-of-process (atmospheric pressure) monitoring tool, using the same capacitive sensors on each probe. For example, once the freeze drying process is complete (and brought back to atmospheric pressure), the humidity in the product is measured by each sensor in the probe, yielding a residual moisture profile of the product in the vial. That is a significant improvement over techniques currently in use for measuring residual moisture. In one such known technique, an overall average residual moisture for all product in a vial is measured after the manufacturing process as a destructive test using analytical techniques such as loss on drying or Karl Fischer titration techniques. Because of the variation in heat transfer across the shelves on which the product is placed, the residual moisture is position dependent. As a result, multiple samples must be taken in a typical development cycle to understand that variation. Such instrumentation and its use is expensive and time consuming. The use of the presently described techniques will help reduce both cost and time associated with such residual moisture tests.

Figure 6:
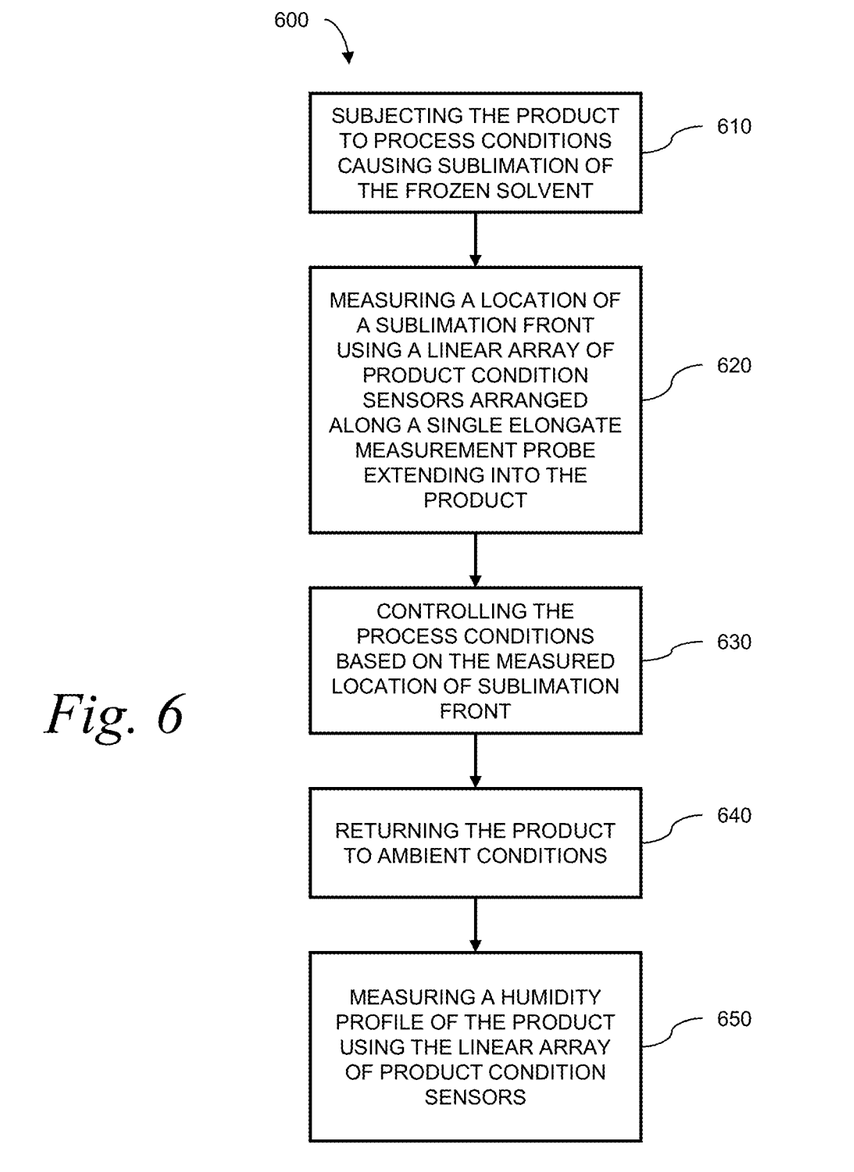
FIG. 6 is a flow chart showing a method in accordance with one aspect of the disclosure.

Embodiments of the present disclosure include a method 600 for freeze drying a product containing a frozen solvent, which is described with reference to FIG. 6. The product is in a plurality of vials having vial openings and arranged in a freeze drying chamber.

The product is subjected (operation 610) to process conditions causing sublimation of the frozen solvent. In addition to vacuum pressure, those conditions typically include low temperature conditions, and the transfer of heat to the vials to provide the energy for sublimation.

A subset of the plurality of vials may be selected to provide a spatial sampling of measurements in the freeze drying chamber. The subset may be chosen, for example, to include expected warmest and coldest vials in the chamber. During the freeze drying process, as the product is subjected to the process conditions, a location of a sublimation front is measured (operation 620) using a linear array of product condition sensors arranged along a single elongate measurement probe extending into the product, the array having a pitch of less than 2 mm. The location of the sublimation front may be measured based on a high spatial resolution temperature profile created using the array of product condition sensors.

The process conditions in the chamber are then controlled (operation 630) based on the measured location of sublimation front. For example, the plurality of product vials may be arranged on a plurality of shelves having an adjustable heat transfer system for transferring heat to vials supported by the shelves. The temperature and pressure conditions may then be controlled based on the measured locations of the sublimation fronts by adjusting an overall flow of heat transfer fluid to the shelves, or by individually adjusting a transfer of heat from a particular shelf to the supported vials based on a measured location of a sublimation front in a vial located on the particular shelf.

In one embodiment, the product is then returned to ambient conditions (operation 640), and, while the product is subjected to the ambient conditions, a humidity profile of the product is measured (operation 650) using the linear array of product condition sensors. That measurement may be used, for example, to determine residual moisture retained by the product, and thereby evaluate the efficacy of the process.

The proposed solution can monitor a large number of installed probes simultaneously using a multi-network functionality, and adjust the process conditions, such as heat transfer rate to the vials, based on the warmest probe, or based on a spatial analysis of readings from throughout the chamber, in order to maintain the optimal conditions. The system will also detect for each sensor a rapid temperature shift associated with the passage of the sublimation front, and adjust process control based on output.

Another identified application of the presently described product condition sensing system is in pharmaceutical applications such as environmental isolators where monitoring temperature and humidity within the barrier system is critical. Isolators provide a fully enclosed environment with dedicated air circuitry, where machines can be segregated, minimizing direct human intervention in the processing area. There is currently no efficient means to measure the temperature and humidity with low spatial resolutions as proposed in the present disclosure. The presently described wireless humidity/temperature sensing device is useful in such applications, which operate at or near atmospheric pressure (atmosphere+/−25 Pa).

In particular, by utilizing separate calibration values of a single capacitive sensor for temperature and humidity, temperature and humidity may be measured simultaneously at a single point in space. Multiple sensors in an array may be averaged to increase measurement accuracy.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A method for freeze drying a product containing a frozen solvent, the product being in a plurality of vials having vial openings and arranged in a freeze drying chamber, the method comprising:
    installing a measurement unit in the vial opening of one of the vials, the measurement unit including a plurality of product condition sensors arranged in a linear array, wherein a position of the product condition sensors relative to the product is fixed, the installing causing the linear array of product condition sensors to be positioned in direct contact with the product along a vertical drying vector of the product;
    subjecting the plurality of vials to process conditions causing sublimation of the frozen solvent;
    while the plurality of vials is subjected to the process conditions, receiving measurement data from each of the product condition sensors of the measurement unit;
    determining a product condition profile along the vertical drying vector of the product based on the measurement data; and
    controlling the process conditions based on the product condition profile.

2. The method of claim 1,
    wherein the plurality of vials is supported on a plurality of shelves, wherein each individual shelf transfers heat from the shelf to vials supported by the shelf;
    wherein the receiving measurement data further comprises receiving an identifier of the vial in which the measurement unit is installed; and
    wherein controlling the process conditions based on the product condition profile further comprises:
        using the identifier of the vial, identifying, from the plurality of shelves, a particular shelf supporting the vial;
        individually controlling a flow of heat transfer fluid to the particular shelf supporting the vial based on the product condition profile.

3. The method of claim 1, further comprising:
    using the product condition profile, determining a location of a sublimation front along the vertical drying vector of the product, the sublimation front delineating product containing frozen solvent below the sublimation front from product containing substantially no solvent above the sublimation front; and
    wherein controlling the process conditions is further based on the location of the sublimation front.

4. The method of claim 3, wherein determining the location of the sublimation front further comprises estimating a characteristic of the product condition profile, the characteristic selected from a maximum, a minimum, a point of inflection and a discontinuity.

5. The method of claim 3, further comprising:
    receiving repeated measurement data from each of the product condition sensors of the measurement unit over time; and
    estimating a propagation velocity of the sublimation front using the repeated measurement data; and
    wherein controlling the process conditions is further based on the propagation velocity of the sublimation front.

6. The method of claim 1, wherein receiving the measurement data further comprises receiving the measurement data via a wireless radio frequency network.

7. The method of claim 1, wherein the plurality of product condition sensors is arranged in a linear array have a pitch of less than 2 mm.

8. The method of claim 1, wherein the linear array of product condition sensors comprises surface mount sensors mounted on a printed circuit board.

9. The method of claim 1, further comprising:
    after subjecting the plurality of vials to the process conditions, subjecting the plurality of vials to ambient conditions;
    under the ambient conditions, measuring a humidity profile of the product using the linear array of product condition sensors; and
    determining an efficacy of the freeze drying based on the humidity profile.

10. The method of claim 1, further comprising:
    powering the measurement unit using a wireless radio frequency powering signal.

11. The method of claim 10,
wherein a plurality of measurement units is installed in a plurality of selected vials among the vials arranged in the freeze drying chamber; and
wherein powering the measurement unit further comprises:
arranging a radio frequency power transmission antenna within the freeze drying chamber, whereby line-of-sight communication is established from the radio frequency power transmission antenna to each of the plurality of measurement units;
by the radio frequency power transmission antenna, transmitting the wireless radio frequency powering signal; and
by each of the plurality of measurement units, harvesting the radio frequency powering signal transmitted from the radio frequency power transmission antenna.

12. The method of claim 10, wherein a need for power wires and batteries in the freeze drying chamber is eliminated.

13. The method of claim 1, wherein the measurement data from the product condition sensors represent temperatures of the product.

14. A method for freeze drying a product containing a frozen solvent, the product being in a plurality of vials having vial openings and arranged in a freeze drying chamber, the method comprising:
installing a measurement unit in the vial opening of one of the vials, the measurement unit including a plurality of product condition sensors arranged in a linear array, wherein a position of the product condition sensors relative to the product is fixed, the installing causing the linear array of product condition sensors to be positioned in direct contact with the product along a vertical drying vector of the product;
subjecting the plurality of vials to process conditions causing sublimation of the frozen solvent;
while the plurality of vials is subjected to the process conditions, receiving measurement data from each of the product condition sensors of the measurement unit;
determining a product condition profile along the vertical drying vector of the product based on the measurement data;
receiving repeated measurement data from each of the product condition sensors of the measurement unit over time;
estimating a propagation velocity of a sublimation front using the repeated measurement data; and
controlling the process conditions based on the product condition profile and the propagation velocity of the sublimation front.

15. The method of claim 14, further comprising:
powering the measurement unit using a wireless radio frequency powering signal.

16. The method of claim 14, wherein the measurement data from the product condition sensors represent temperatures of the product.

17. A method for freeze drying a product containing a frozen solvent, the product being in a plurality of vials having vial openings and arranged in a freeze drying chamber, the method comprising:
installing a measurement unit in the vial opening of one of the vials, the measurement unit including a plurality of product condition sensors arranged in a linear array, wherein a position of the product condition sensors relative to the product is fixed, the installing causing the linear array of product condition sensors to be positioned in direct contact with the product along a vertical drying vector of the product and wherein the linear array of product condition sensors comprises surface mount sensors mounted on a printed circuit board;
subjecting the plurality of vials to process conditions causing sublimation of the frozen solvent;
while the plurality of vials is subjected to the process conditions, receiving measurement data from each of the product condition sensors of the measurement unit;
determining a product condition profile along the vertical drying vector of the product based on the measurement data; and
controlling the process conditions based on the product condition profile.

18. The method of claim 17, wherein the plurality of product condition sensors is arranged in a linear array have a pitch of less than 2 mm.

19. The method of claim 17, further comprising:
powering the measurement unit using a wireless radio frequency powering signal.

20. The method of claim 17, wherein the measurement data from the product condition sensors represent temperatures of the product.

\* \* \* \* \*